(12) United States Patent
Petrunka et al.

(10) Patent No.: US 7,386,110 B2
(45) Date of Patent: Jun. 10, 2008

(54) DIRECTORY ASSISTANCE UTILIZING A PERSONALIZED CACHE

(75) Inventors: Robert W. Petrunka, Raleigh, NC (US); Brian T. Paley, Norcross, GA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 655 days.

(21) Appl. No.: 10/641,240

(22) Filed: Aug. 14, 2003

(65) Prior Publication Data

US 2005/0036601 A1 Feb. 17, 2005

(51) Int. Cl.
H04M 3/493 (2006.01)
H04M 1/64 (2006.01)
H04M 3/527 (2006.01)

(52) U.S. Cl. .............................. 379/218.01; 379/88.01

(58) Field of Classification Search .............................. 379/218.01–218.02, 88.01–88.03
See application file for complete search history.

(56) References Cited

U.S. PATENT DOCUMENTS

| | | | |
|---|---|---|---|
| 5,924,070 A * | 7/1999 | Ittycheriah et al. ......... 704/275 |
| 5,999,611 A | 12/1999 | Tatchell et al. |
| 6,041,300 A | 3/2000 | Ittycheriah et al. |
| 6,052,439 A | 4/2000 | Gerzberg et al. |
| 6,144,723 A | 11/2000 | Truchon et al. |
| 6,233,316 B1 | 5/2001 | Schier et al. |
| 6,292,478 B1 | 9/2001 | Farris |
| 6,370,237 B1 | 4/2002 | Schier |
| 6,404,876 B1 * | 6/2002 | Smith et al. ........... 379/218.01 |
| 6,643,622 B2 * | 11/2003 | Stuart et al. ................. 704/275 |
| 6,731,737 B2 * | 5/2004 | Davis et al. ........... 379/218.01 |
| 6,870,915 B2 * | 3/2005 | Stillman et al. ....... 379/201.01 |
| 6,990,189 B2 * | 1/2006 | Ljubicich ............... 379/218.01 |
| 2002/0003867 A1 | 1/2002 | Rothschild et al. |
| 2002/0041659 A1 | 4/2002 | Beswick et al. |
| 2002/0196922 A1 | 12/2002 | Marwell et al. |
| 2003/0076934 A1 | 4/2003 | Albal et al. |
| 2004/0156491 A1 * | 8/2004 | Reding et al. ......... 379/201.02 |
| 2004/0234047 A1 * | 11/2004 | Ciccarelli et al. ........ 379/88.16 |
| 2004/0243549 A1 * | 12/2004 | Richartz et al. ................ 707/3 |

FOREIGN PATENT DOCUMENTS

EP 0 872 998 A1 10/1998

* cited by examiner

Primary Examiner—Harry S Hong

(57) ABSTRACT

A directory assistance platform embodiment includes a directory assistant and a personalized cache. The personalized cache is accessible using voice recognition software to provide access to personalized contact information. The directory assistant can provide access to a number of directory information resources in compliment to the personalized cache.

25 Claims, 7 Drawing Sheets

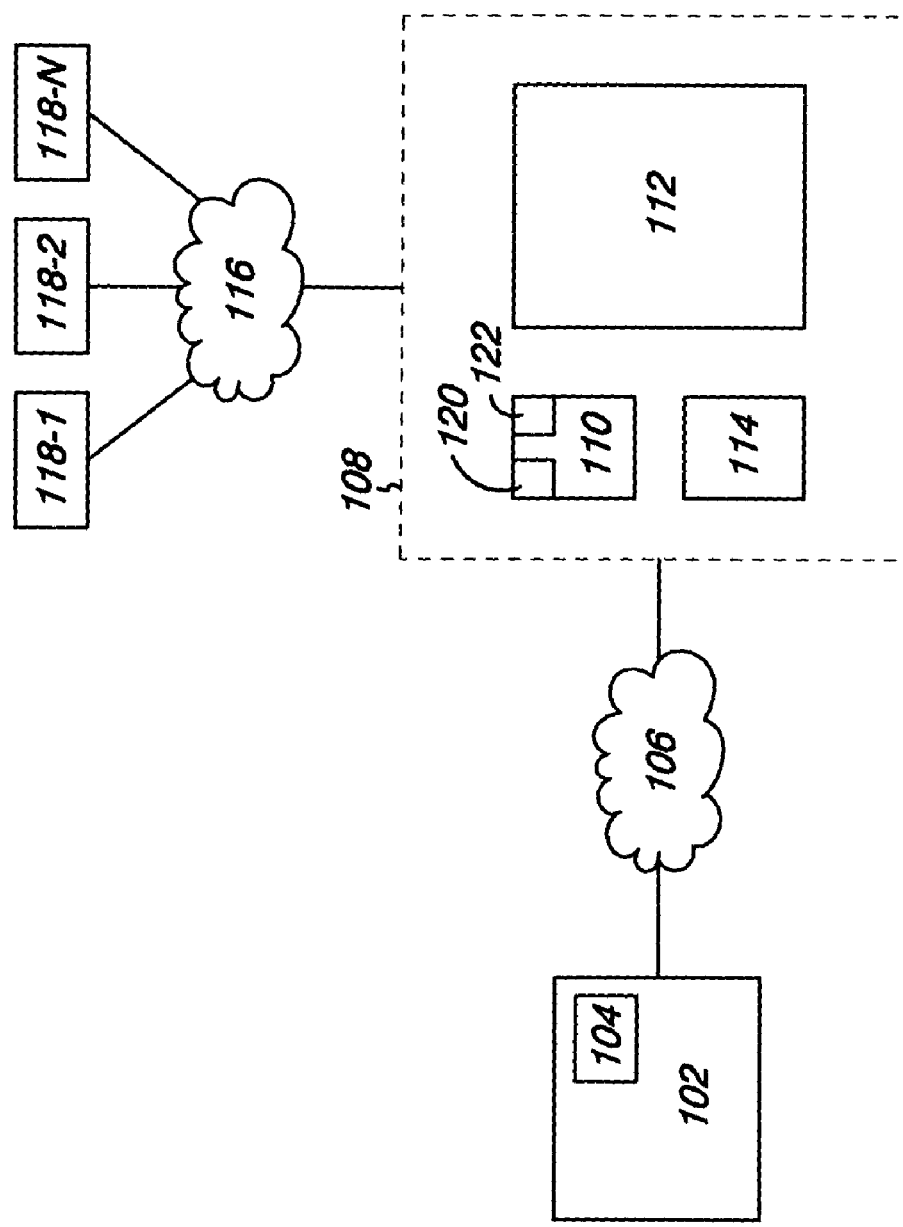

DIRECTORY ASSISTANCE UTILIZING A PERSONALIZED CACHE

Directory assistance services enable users to locate information for individuals or companies that a user desires to contact. Examples of information that can be obtained from directory assistance services include an address, phone number, and/or IP address, among others. The information can be obtained from these services through the use of a device having wired or wireless telephone capabilities.

In many directory assistance systems, services can be provided by a directory assistance platform wherein a directory assistant can access a large resource containing local, regional, national, and/or worldwide information to retrieve information. The directory assistant can, for example, be an automated system such as an Interactive Voice Response (IVR) system that utilizes a computer to interact with the user or exchange information. However, these systems do not provide access, for example, to cell phone numbers or to corporate directories. Additionally, these large systems can be expensive and are not personalized to hold user specific information.

Handheld devices, such as PDAs, mobile telephones, and the like, can have a personal database with directory information resident on the device itself. These databases can include, for example, information on an individual such as their name, title, business, address, phone number, and e-mail address, among others. Directory information is also stored in Local Area Networks (LANs) and, for example, a company's LAN can include personal information for the people who work at the company. For example, the database could contain names of the people that work at a business, their work contact information, and their home information.

Many devices, such as handhelds and LANs, require this information to be manually entered and maintained in the device. Because of the amount of information that must be input, edited, and deleted to complete and maintain a directory database on the device, the amount of time necessary for entering and deleting the contact information can become large.

Further, there are instances where a user cannot access a LAN database when the database is not available for use. Additionally, there are also instances where a handheld device cannot be accessed, for example, in situations such as, when the user does not have the device in his/her possession, when the device cannot be powered up, or when the device is broken, among many other situations.

Although handhelds and LANs can provide some personal information and a directory assistance service can provide broad generic directory information, these systems and devices do not, for example, provide directory information from a single source or interact to build a personal directory from information within the resources of the directory assistance service. As such, users have to turn to a collection of these resources to capture all available contact information.

BRIEF DESCRIPTION OF THE DRAWINGS

FIG. 1 is a block diagram of a system embodiment illustrating a connection between a remote device and a directory assistance platform.

DETAILED DESCRIPTION

Figure 2A:
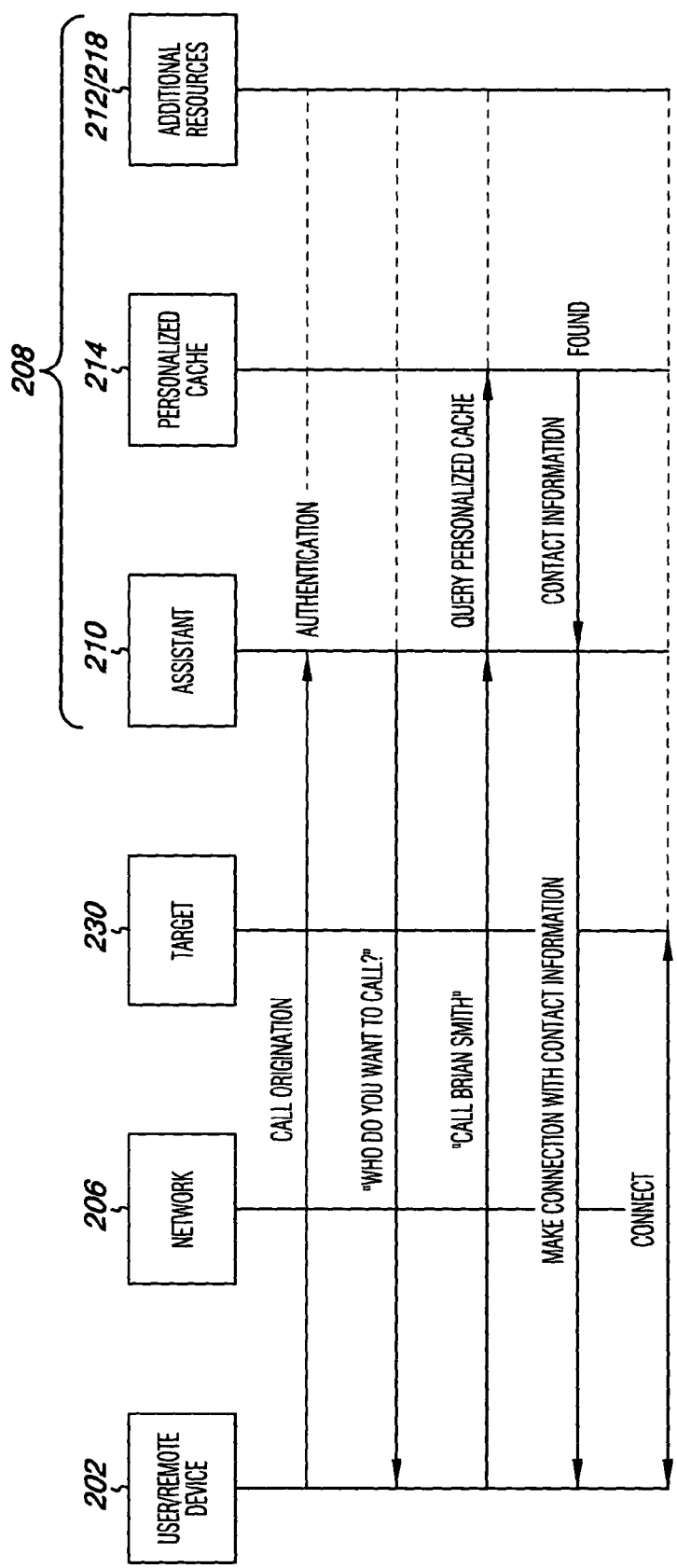
FIG. 2A is a call flow diagram for an embodiment of the invention.

As one of ordinary skill in the art will appreciate upon reading this disclosure, devices, as referred to herein as a remote device, can include wired or wireless devices having telephone capabilities. This can include, for example, mobile handheld devices having telephone capabilities. Such devices can include multifunction devices having, voice, data, and video. Thus, the devices can be wireless phones, other mobile handheld devices, and the like, and can include wired devices such as telephones, desktop or laptop computers, among others. This assortment of devices is referred to collectively herein as remote devices.

Remote devices can be part of a larger networked environment, such as LANs, Metropolitan Area Networks (MANs), and the like. The discussion which follows illustrates, by way of example and not by way of limitation, various network and system environments, devices, and methods that implement or include embodiments of the present invention.

Embodiments of the present invention provide directory assistance services having personalized features. A specific user can utilize directory assistance services all through one connection or access point. However, embodiments of the invention also allow for the access of a wide variety of information, plus access to a personalized set of information.

Embodiments can be performed by software, application modules, and computer executable instructions operable on the systems and devices shown herein or otherwise. The invention, however, is not limited to any particular operating environment or to software written in a particular programming language. Software, application modules, and/or computer executable instructions, suitable for carrying out embodiments of the present invention, can be resident in one or more devices or locations or in several and even many devices or locations. Forms of computer readable media include Flash memory, RAM, ROM, and DDRAM, among others.

Additionally, in reading this disclosure and claims, it should be noted that the indefinite article "a" or "an" as it is used herein is not intended to limit the number of elements to one.

FIG. 1 is a block diagram of a system embodiment illustrating a connection between a remote device and a directory assistance service. In this embodiment, the system includes a remote device 102 having memory storage 104 thereon, a communications link 106, and a directory service platform 108 having an assistant 110, a directory information system/resource 112, and a personal cache 114 therein. As shown in the embodiment of FIG. 1, the system can also include a number of additional directory information resources 118-1 to 118-N that can be accessed by a communications link 116.

In various embodiments, a communication can be initiated from a remote device to a directory assistance service.

The directory assistance service can be utilized, for example, to directly connect a remote device, having telephone communication capabilities to a telephone number requested. The directory information obtained can also be held in a cache for use by an autodialing program, for example, within a personalized cache area of a directory assistance platform.

As used herein, "target contact" includes the information sought by the user of the remote device. For example, if the user is seeking the telephone number for Brian Smith, the telephone number is the target contact.

A remote device, such as device 102 shown in FIG. 1, can be connected to the directory assistance platform 108, and described herein, in any manner. For example, the connection can be by electromagnetic signals (e.g. radio frequency signals, optical signals, etc.), electronic signals, or the like.

In this embodiment, a user can contact the directory service platform 108 from any type of remote device 102. For example, the user can contact the directory service platform 108 via a wired telephone through a communications link 106, such as the public switched telephone network (PSTN), Internet, wireless network, or any combination thereof, among others. The user can also contact the directory service platform 108 via a handheld device 102 such as a wireless phone or a multifunction device (e.g. a PDA with telephone capabilities) through a cellular, satellite, or Internet communications link 106, among others.

The device 102 can utilize a voice activated dialing application (VAD) wherein memory 104 holds the VAD application. In embodiments utilizing VAD, the device 102 can be operable to call the directory service platform 108 when a command is spoken. However, the embodiments of the invention are not so limited. Those skilled in the art will understand that initiation of a call to the directory service platform 108 can be accomplished in any manner. For example, the remote device 102 can have a mechanism, such as a button or switch mechanism, that triggers the device 102 to call the directory service platform 108.

The directory assistant 110, for example, can be a computer system such as a system having a media platform including an interactive voice response (IVR) program. IVR systems typically utilize automatic speech recognition (ASR) technology through use of ASR 120 and text-to-speech (TTS) 122 modules to identify the information that is being requested by voice communication. Some IVR systems utilize artificial intelligence programming to anticipate or identify the information that is requested by a user.

Oftentimes, an IVR asks a series of questions to narrow the amount of possible answers that might be given by the user. Those skilled in the art will understand that an automated directory assistant can be provided in any suitable manner, such as by an IVR system, among others.

In various embodiments, the user can access the directory assistant 110 that can aid the user in finding the requested information within their personalized cache 114. The personalized cache can be provided as a particular individual's set of contact information stored in a data structure such as a list or matrix of information within a database. For example, the assistant 110 can ask, "Who do you want to contact?" The user can respond and the assistant 110 can use the response to search the personalized cache 114 to find the requested information.

The assistant 110 can be operable to ask the user to choose from a list of choices, such as a list of directories or a list of target contact information. For example, when there are several telephone number choices for a target contact (e.g. Brian Smith), the assistant 110 can ask, "Do you want to contact Brian at the home, work, or mobile number?"

In various embodiments, when several choices are available, the assistant 110 can be configurable to either automatically select one choice that has been pre-selected either by the user or by the target contact, to contact more than one choice, or to contact all choices. Additionally, the choices can be categorized in any manner. For example, the choices can be categorized from the most likely choice to the least likely choice.

If the information is not found in the personalized directory, the directory assistant 110 can initiate a number of searches in other resources 112 and 118-1 to 118-N and can ask questions to solicit information, if more information is needed to identify the correct information in the resource.

For example, the directory assistant 110 can send a query to one of a number of resources 112 and/or 118-1 to 118-N to which the assistant 110 has access. If more information is needed to identify the correct information in the resource, the assistant 110 can ask questions or list a number of possible choices to solicit the information needed. For instance, when looking for a target contact for Brian Smith, the assistant 110 can ask, "What city and state is Brian in?"

As another example, the directory assistant 110 can have access to one or more additional resources 112 and 118-1 to 118-N. The additional resources can be additional databases having contact information data stored therein. For example, the directory assistant 110 could have access to a white pages type resource, a yellow pages type resource, and/or to an Internet type resource, among others. Those skilled in the art will understand that any resource can be utilized. Additionally, the resources can be of multiple types and have various scopes. For example, the resources can be local, national, international, or specific to a subject, such as a corporate directory, among others.

The resources can be accessed according to a predefined or user selectable hierarchy. For example, the user can select a hierarchy having a company resource, then a local white pages type resource, and a regional resource. In this way, the directory assistant searches the company resource, and if the requested information is not found, searches the local white pages and so on until the information is located. Hierarchical structures can include, but are not limited to, user configurable, by date last accessed, by size, and/or by subject matter, among others.

If the desired information is located by the directory assistant 110, the directory assistant 110 can also add the information or modify existing information in the personalized cache 114 of the directory assistance platform 108. In this way, once the information has been added to the personalized cache 114, the next time the information is requested it can be accessed from the personalized cache 114 instead of having the directory assistant 110 retrieve the information every time the information is needed.

Additionally, a user can add information to the personalized cache 114. For example, when the cache is first set up, or in an ongoing manner, the user can provide information to the cache 114 without accessing the directory assistant 110. Those skilled in the art will understand that information can be added to the cache in any manner (e.g. wired, wireless, etc.) and in any format, (e.g. voice, data, and the like).

In the embodiment shown in FIG. 1, when the personalized cache 114 on the directory assistance platform 108 is accessed, the cache can be searched to identify if the directory information sought is available or located on the cache 114. If the information is not found in the personalized cache 114, the query can be transferred to an additional resource 112 and/or 118-1 to 118-N, as discussed above.

Once the information from the query has been found, the user initiating the query can be connected to the target contact that was the subject of the query. Those skilled in the art will understand that the connection of the user to a target contact can be accomplished in any manner. For example, the connection can be accomplished via a release link trunking (RLT) protocol as the same will be known and understood by one of ordinary skill in the art. The RLT feature allows systems to release a call to network switches immediately after call interactions are complete, thus increasing the productivity of systems, since, once the call is released one communication link is utilized instead of two.

FIG. 2A is a call flow diagram for an embodiment of the invention. In this embodiment, the call begins with the origination of the call from a remote device 202 across network 206 to a directory assistance platform 208. The remote device 202, network 206, and directory assistance platform 208 can, for example, be devices and systems (i.e., device 102, link 106, and platform 108, respectively) such as are shown and described with respect to FIG. 1. The directory assistance platform 208 includes an assistant 210, a personalized cache 214 and in communication with additional resources 212/218. The call is authenticated by the directory assistant 210. Authentication can also include authorization and accounting functions.

Authentication can include identification of the user of the remote device 202. This can be accomplished in any suitable manner. For example, the remote device 202 can have an electronic identification number that can be utilized for authentication. Some examples of electronic identification numbers include, but are not limited to, Mobile Identification Numbers (MINs), mobile directory numbers, and mobile serial numbers. In some embodiments, the user 202 can enter a user identification code, for example by speaking or by keypad entry into remote device 202, to authenticate the call.

Once the call is authenticated, the user 202 can request the information to be retrieved or, as shown in FIG. 2A, the directory assistant 210 can solicit information from the user of the remote device 202. For example, the directory assistant 210 can ask the user 202 a number of questions, such as "Who do you want to call?" The user 202 replies "Call Brian Smith." The assistant 210 queries the personalized cache 214 to determine if Brian Smith's contact information is within the personalized cache 214. If Brian Smith's contact information is found, it is retrieved and the connection is made between the remote device 202 and Brian Smith at the target contact 230 based on the contact information found. Additionally, the information to be retrieved can be identified by utilizing a number of automated prompts for voice response, for example, to verbally select between a choice of numbers in a directory.

Figure 2B:
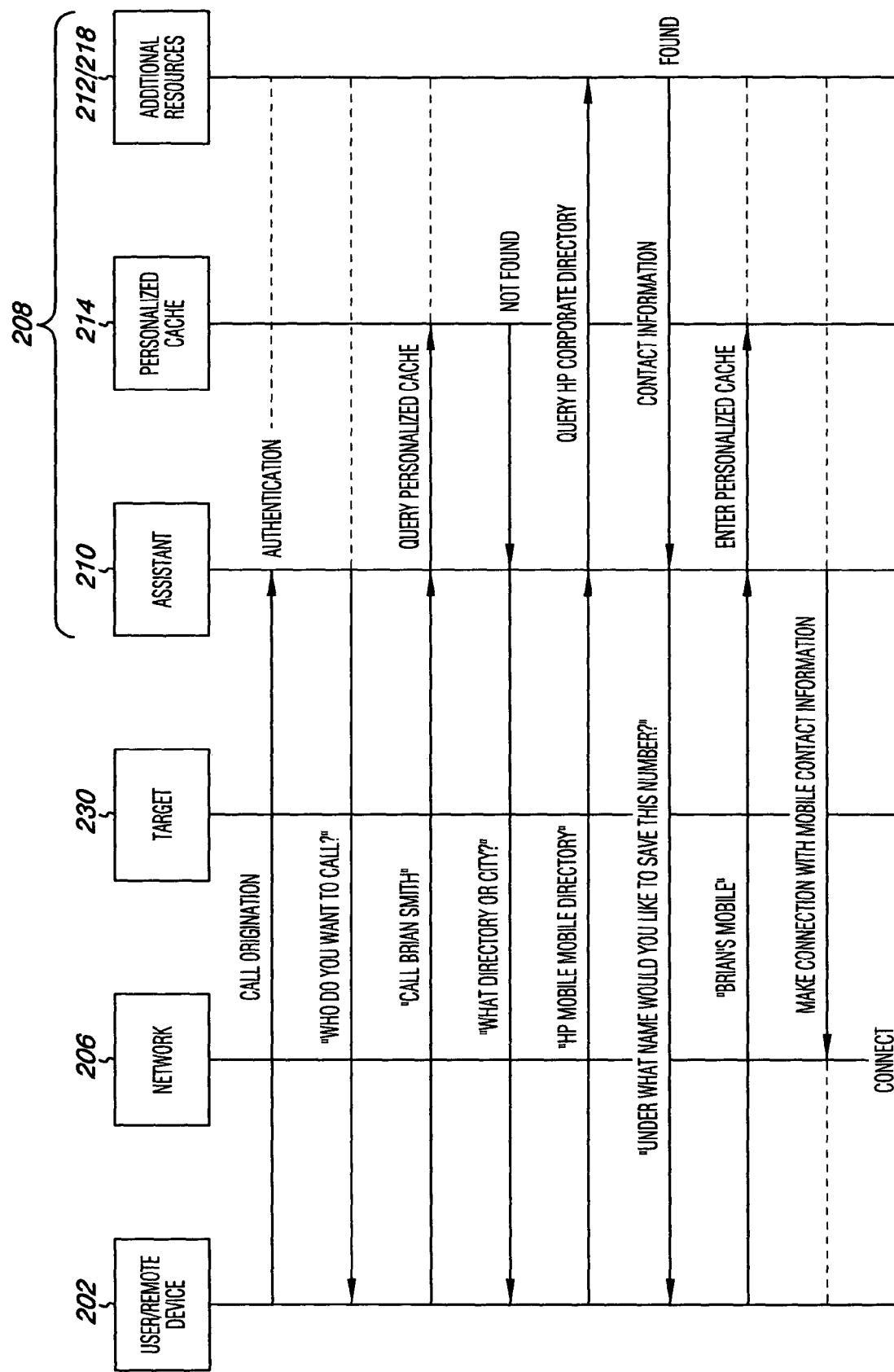
FIG. 2B is another call flow diagram for an embodiment of the invention.

FIG. 2B is another call flow diagram for an embodiment of the invention in which the information requested is not within the personalized cache. For illustration purposes, in FIG. 2B the call is originated, authorized, the assistant has asked a question to solicit information from the user 202, and the user has provided a request for directory information as is described in detail above.

However, in this embodiment, the requested information is not within the personalized cache 214 and therefore a "not found" message is conveyed from the personalized cache 214 to the assistant 210. The assistant 210 can choose one or more additional resources 212/218 to search or ask the user 202 if there is another resource that should be checked.

In FIG. 2B, the assistant 210 asks the user 202 if there is a specific resource that should be checked first and/or for additional information to find the requested information. For example, the assistant 210 can ask the user 202 "What directory or city?" The user 202 can then reply, such as, "HP mobile directory". The assistant 210 checks the HP mobile directory and finds the requested information.

The assistant 210 can connect the user 202 to the target contact 230 and/or store the information in the personalized cache 214. In the example shown in FIG. 2B, prior to or when storing the information, the assistant 210 asks the user 202 to assign the information a name so that the user can reference the name the next time the information is needed. For example, the user 202 could name the information "Brian's mobile" and the next time the user had to request the information, the user could ask for Brian's mobile instead of having to provide the extra information as described above.

Figure 2C:
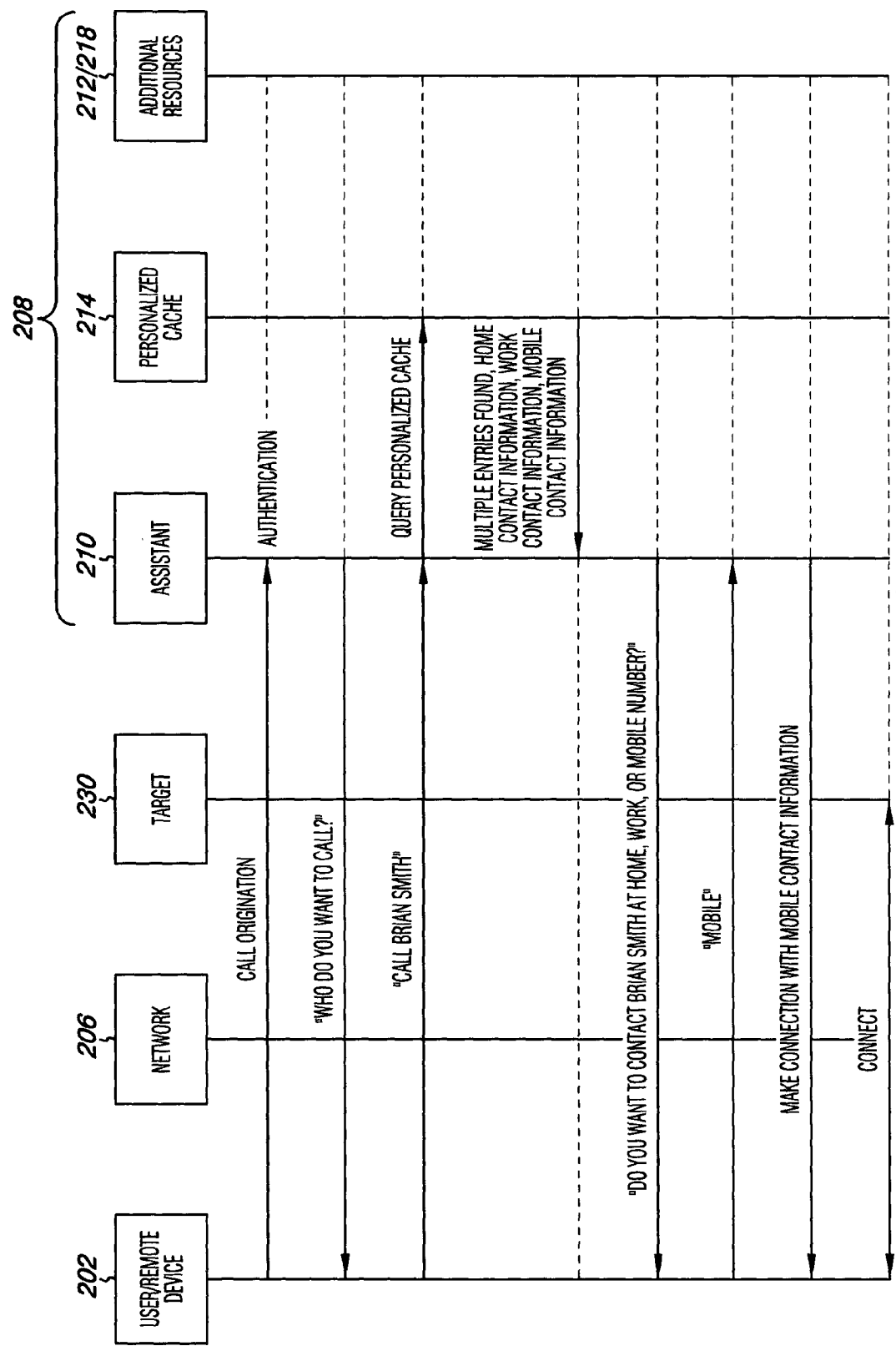
FIG. 2C is another call flow diagram for an embodiment of the invention.

FIG. 2C is another call flow diagram for an embodiment of the invention. In this embodiment, three possible choices are retrieved by the assistant 210 and therefore one or more of the choices can be selected.

For illustration purposes, in FIG. 2C, the call is originated, authorized, the assistant 210 has asked a question to solicit information from the user 202, and the user has provided a request for directory information as has been described above. Further, the assistant 210 has found three contact choices that satisfy the request for information.

The assistant 210 can make the selection in any suitable manner. For example, the assistant 210 can automatically make the selection or the assistant 210 can ask for input from the user 202. In FIG. 2C, the assistant 210 asks the user, "Do you want to contact Brian at the home, office, or mobile number?" The user 202 replies, "Mobile". Based on this selection, the assistant 210 connects the remote device 202 to Brian's mobile number (i.e. target 230). In some embodiments, this reply can also be utilized to create a choice for when the information is next requested. For example, the next time Brian's information is requested, Brian's mobile could be selected as the default contact.

Those skilled in the art will understand that more than one, or all, of the choices can be contacted. This feature can be effective, for example, in an emergency, where the user has to reach the target contact as soon as possible.

Figure 3:
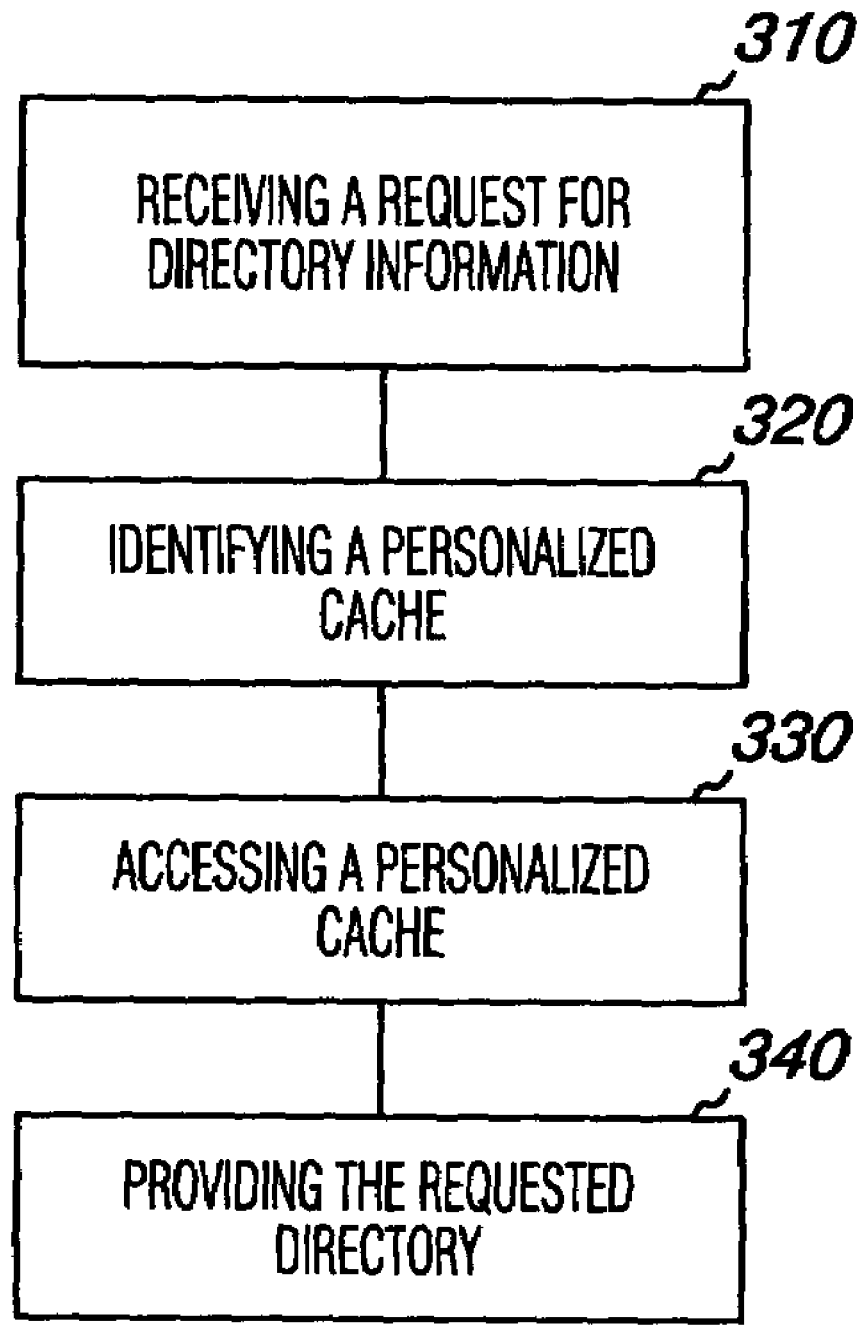
FIG. 3 is a block diagram of a method embodiment for accessing directory information from a directory assistance platform.
Figure 4:
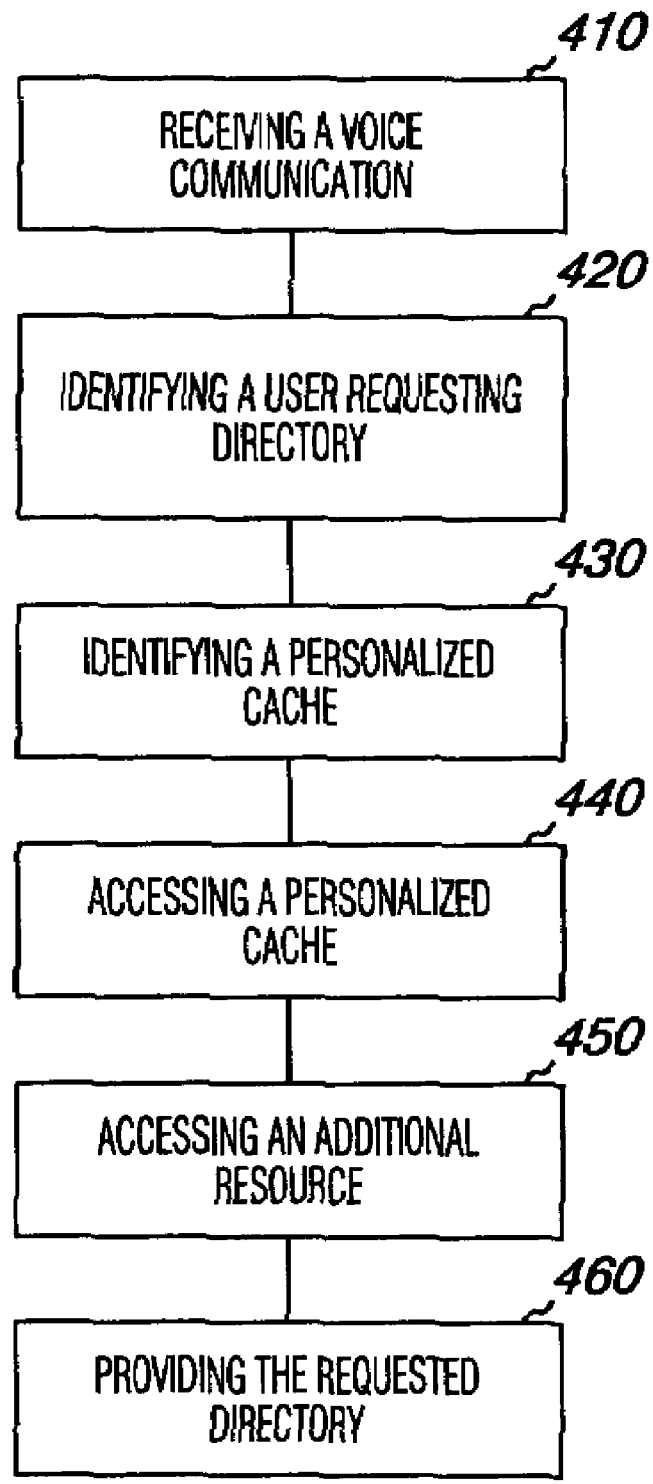
FIG. 4 is a block diagram of another method embodiment for accessing directory information from a directory assistance platform.
Figure 5:
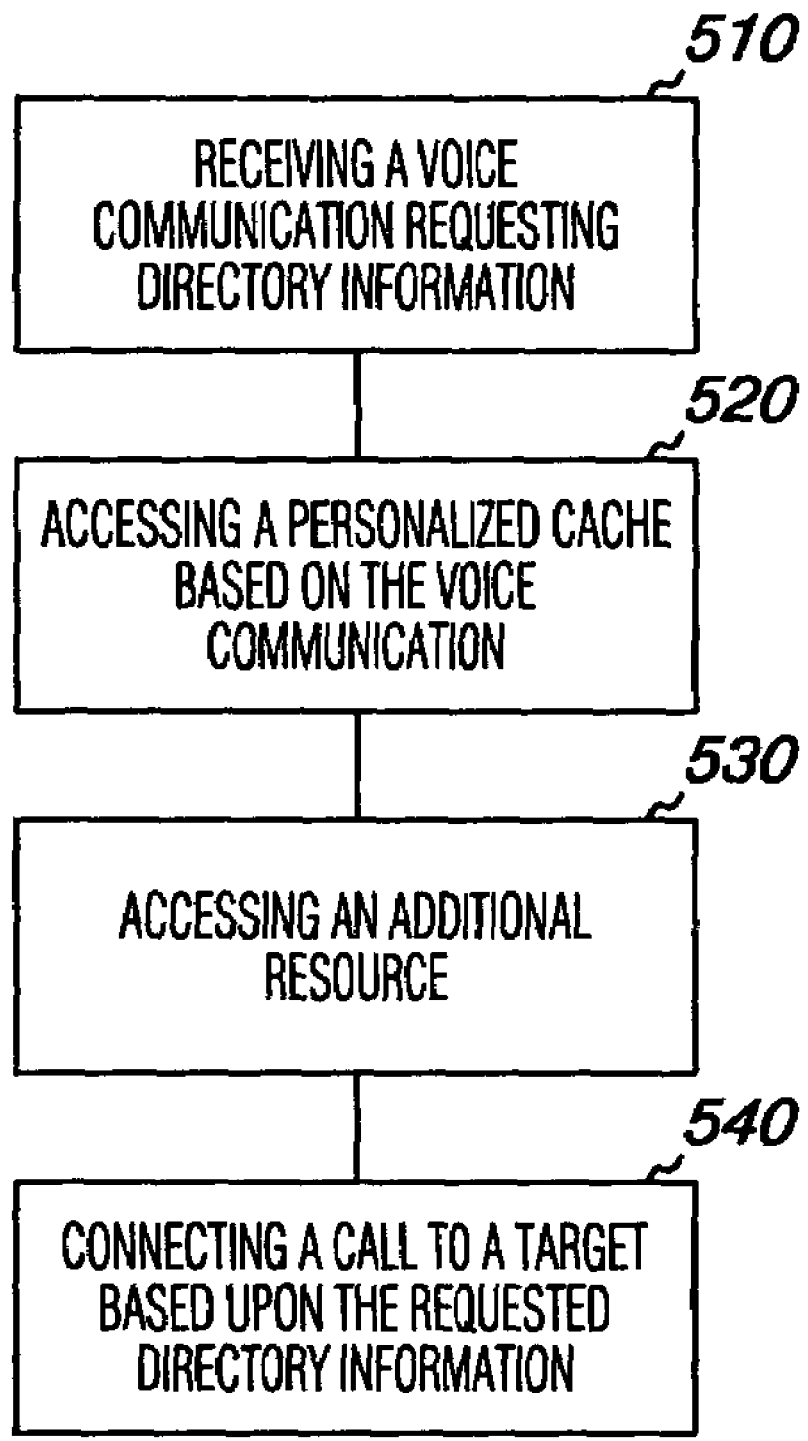
FIG. 5 is a block diagram of another method embodiment for accessing directory information from a directory assistance platform.

FIGS. 3, 4, and 5 illustrate block diagrams of various method embodiments of the present invention. Unless explicitly stated, the method embodiments described herein are not constrained to a particular order or sequence. Additionally, some of the described method embodiments and elements thereof can occur or be performed at the same point in time.

FIG. 3 is a block diagram of a method embodiment for accessing directory information from a directory assistance platform. The method can include receiving a request for directory information at block 310. The request can include user identification information. The communication can be received as voice request by an interactive voice response (IVR) system.

The method also includes identifying a personalized cache at block 320. The personalized cache can correspond to the user identification information received. The user identification information can be compared with a database of user identifiers. For example, identification information can include unique identification information, such as a serial number, assigned to the remote device or the user's name or an assigned identifier, among others. In some embodiments, the identification information can include a password for security protection of the personalized cache.

In FIG. 3, the method also includes accessing a personalized cache at block 330. The personalized cache can be accessed to identify if the requested directory information is present in the personalized cache. In this embodiment, the method also includes providing the requested directory information at block 340. The requested directory information can be provided for access by the user.

The method can also include accessing an additional resource if the requested directory information is not present in the personalized cache. The additional resource can be a restricted access company cache accessible to employees of a company having information within the restricted access company cache. In this way, a user can access company contact information via the directory assistance platform.

The restricted access company cache can include a personalized cache within the restricted access company cache. This feature allows the user to maintain personalized contact information in the restricted area. Those skilled in the art will understand that the personalized information maintained within the area can be the user's entire personalized cache or can be company specific personal contact information.

FIG. 4 is a block diagram of another method embodiment for accessing directory information from a directory assistance platform. In the embodiment shown in FIG. 4, the method includes receiving a voice communication at block 410. The directory information can include user identification information. The directory information can be received via a Voice over Internet Protocol (VoIP) media path. Those skilled in the art will under stand that VoIP is the two-way transmission of audio signals over a packet-switched IP network (TCP/IP network). When used in a private intranet or WAN contexts, it is generally known as "voice over IP," or "VoIP." When the transport is the public Internet or the Internet backbone from a carrier, it is generally called "IP telephony" or "Internet telephony." However, for the purpose of the describing various embodiments of the present invention, the term VoIP can be considered to include private intranet, WAN, public Internet, or Internet backbone transmissions, among others.

In FIG. 4, the method also includes identifying a user requesting the directory information at block 420. The embodiment illustrated in FIG. 4 also includes identifying a personalized cache at block 430. The personalized cache can include a cache corresponding to the user identification information received.

The embodiment also includes accessing a personalized cache at block 440. The personalized cache can be accessed to identify if the requested directory information is present in the personalized cache.

The embodiment of FIG. 4 also includes accessing an additional resource at block 450. Additional resources can be accessed to identify if the requested directory information is present in an additional resource. An additional resource can be accessed if the requested directory information is not present in the personalized cache.

The embodiment shown also includes providing the requested directory information at block 460, such as for access by the user.

An access number can be obtained from the requested directory information and connecting the user to a target user based upon the access number obtained. Obtaining an access number can include an access number that is a telephone number. The requested directory information can be stored to the personalized cache.

FIG. 5 is a block diagram of another method embodiment for accessing directory information from a directory assistance platform. In the embodiment shown in FIG. 5, the method includes receiving a voice communication requesting directory information at block 510. The voice communication requesting directory information can be received with an automatic speech recognition engine.

The method also includes accessing a personalized cache based on the voice communication at block 520. The method also includes accessing an additional resource at block 530. An additional resource can be accessed if the requested directory information is not present in the personalized cache. The requested directory information can be saved to the personalized cache. The illustrated method also includes connecting a call to a target based upon the requested directory information at block 540.

An additional resource can be accessed via a communications link. The user and the target contact can be connected via a release link trunking protocol.

Although specific embodiments have been illustrated and described herein, those of ordinary skill in the art will appreciate that any arrangement calculated to achieve the same techniques can be substituted for the specific embodiments shown. This disclosure is intended to cover adaptations or variations of various embodiments of the invention. It is to be understood that the above description has been made in an illustrative fashion, and not a restrictive one.

Combination of the above embodiments, and other embodiments not specifically described herein will be apparent to those of skill in the art upon reviewing the above description. The scope of the various embodiments of the invention includes other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. § 1.72(b) requiring an Abstract that will allow the reader to quickly ascertain the nature of the technical disclosure. It is submitted with the understanding that it will not be used to limit the scope of the claims.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A directory assistance platform, comprising:
   An automated directory assistant, accessible using voice recognition software, to provide access to a number of directory information resources;
   a directory information resource including a personalized cache accessible by the directory assistant using voice recognition software to provide access to personalized contact information provided within a restricted access company cache accessible by employees of a company; and
   an additional directory information resource accessible by the directory assistant, wherein if requested contact information is not present in the personalized cache:

the additional directory information resource is accessed; and the requested contact information is stored in the personalized cache if the requested contact information is present in the additional directory resource.

2. The platform of claim 1, wherein the number of directory information resources include a configurable hierarchy of resources.

3. The platform of claim 1, wherein the directory assistance platform includes a directory assistance platform utilizing automatic speech recognition.

4. The platform of claim 1, wherein the directory assistance platform can be accessed using a Voice over Internet Protocol media path connection.

5. The platform of claim 1, wherein the directory assistance platform can be accessed over a wireless connection.

6. The platform of claim 1, wherein the personalized cache can accept information from the directory assistant.

7. The platform of claim 1, wherein the directory assistant provides access to a configurable hierarchy of information resources in compliment to the personalized cache.

8. A directory assistance network, comprising:
an automated directory assistant, accessible using voice recognition software, to provide access to a number of directory information resources;
a directory assistance platform in communication with the number of directory information resources;
a personalized cache in communication with the directory assistant, the cache to receive directory information from the directory assistant and to provide access to personalized contact information provided within a restricted access company cache accessible by employees of a company; and
an additional directory information resource accessible by the directory assistant, wherein if requested contact information is not present in the personalized cache:
the additional directory information resource is accessed; and
the requested contact information is stored in the personalized cache if the requested contact information is present in the additional directory resource; and
means for connecting a call to a contact number found within the network.

9. The directory assistance network of claim 8, further including means for updating a contact number to the personalized cache.

10. The directory assistance network of claim 8, wherein the means for connecting includes automated prompts for voice response.

11. The directory assistance network of claim 10, wherein the automated prompts for voice response includes automated prompts for voice response to verbally select between a choice of numbers in a directory.

12. The directory assistance network of claim 8, wherein the means for connecting a call includes means for connecting to connect the call via release link trunking protocol.

13. The directory assistance network of claim 8, further including means to categorize the number of directory information choices in a hierarchy from most likely choice to least likely choice.

14. A method for accessing directory information from a directory assistance platform, the method comprising:
accessing an automated directory assistant, using voice recognition software, to provide access to a number of directory information resources;
receiving a request for directory information including user identification information;
identifying a personalized cache corresponding to the user identification information received;
accessing a restricted access company cache accessible by employees of a company having information within the restricted access company cache;
providing the requested directory information for access by the user if the requested directory information is present in the personalized cache; and
if the requested directory information is not present in the personalized cache;
accessing an additional directory information resource; and
storing the requested directory information to the personalized cache.

15. The method of claim 14, further including accessing a restricted access company cache having a personalized cache within the restricted access company cache.

16. The method of claim 14, wherein receiving a request for directory information includes receiving a voice request with an interactive voice response (IVR) system.

17. A method for accessing directory information from a directory assistance platform, the method comprising:
accessing an automated directory assistant, using voice recognition software, to provide access to a number of directory information resources;
receiving a voice communication requesting directory information including user identification information;
identifying a user requesting the directory information;
identifying a personalized cache corresponding to the user identification information received;
accessing a restricted access company cache accessible by employees of a company having a personalized cache within the restricted access company cache; and
providing the requested directory information for access by the user if the requested directory information is present in the personalized cache; and
if the requested directory information is not present in the personalized cache;
accessing an additional directory information resource; and
storing the requested directory information to the personalized cache.

18. The method of claim 17, wherein receiving a voice communication requesting directory information includes receiving requested directory information via a Voice over Internet protocol (VoIP) media path.

19. The method of claim 17, further including obtaining an access number from the requested directory information and connecting the user to a target user based upon the access number obtained.

20. The method of claim 19, wherein obtaining an access number includes obtaining an access number that is a telephone number.

21. The method of claim 17, wherein the method includes prompting the user to assign a name to the requested information stored in the personalized cache.

22. A computer readable medium having instructions for causing a device to perform a method, the method comprising:
accessing an automated directory assistant, using voice recognition software, to provide access to a number of directory information resources;
receiving a voice communication requesting directory information using an automatic speech recognition engine;

accessing a restricted access company cache accessible by employees of a company having a personalized cache within the restricted access company cache based on the voice communication;

accessing an additional resource if the requested directory information is not present in the personalized cache and saving the requested directory information to the personalized cache;

connecting a call to a target based upon the requested directory information; and prompting the user to assign a name to the requested information saved to the personalized cache.

23. The computer readable of claim 22, wherein the method includes accessing an additional resource via a communications link.

24. The computer readable of claim 22, wherein the method includes connecting a call to a target via a release link trunking protocol.

25. The computer readable of claim 22, wherein the method includes receiving the name of a target to be contacted.

* * * * *

UNITED STATES PATENT AND TRADEMARK OFFICE
CERTIFICATE OF CORRECTION

PATENT NO.         : 7,386,110 B2                            Page 1 of 1
APPLICATION NO. : 10/641240
DATED              : June 10, 2008
INVENTOR(S)        : Robert W. Petrunka et al.

It is certified that error appears in the above-identified patent and that said Letters Patent is hereby corrected as shown below:

In column 8, line 56, in Claim 1, delete "An" and insert -- an --, therefor.

In column 10, line 47, in Claim 18, delete "protocol" and insert -- Protocol --, therefor.

In column 12, line 1, in Claim 23, after "readable" insert -- medium --.

In column 12, line 4, in Claim 24, after "readable" insert -- medium --.

In column 12, line 7, in Claim 25, after "readable" insert -- medium --.

Signed and Sealed this

Tenth Day of March, 2009

JOHN DOLL
*Acting Director of the United States Patent and Trademark Office*